Dec. 27, 1938.   W. ZIEGENBEIN   2,141,677
LEAD-IN SEAL
Filed June 24, 1937
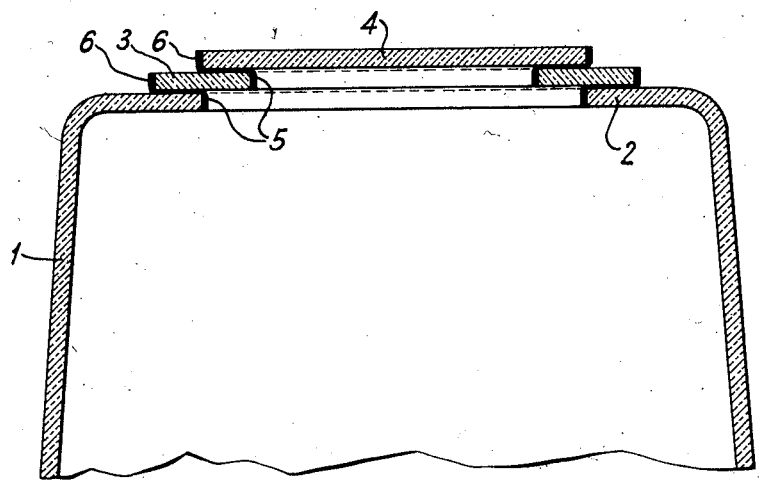
INVENTOR
WILHELM ZIEGENBEIN
BY *Charles McClair*
ATTORNEY Patented Dec. 27, 1938

2,141,677

UNITED STATES PATENT OFFICE 2,141,677

LEAD-IN SEAL

Wilhelm Ziegenbein, Berlin, Germany, assignor to Allegemiene Elektricitats Gesellschaft, Berlin, Germany, a corporation of Germany Application June 24, 1937, Serial No. 150,022
In Germany February 29, 1936

2 Claims. (Cl. 250—27.5)

Current lead-in conductors extending through the wall of vacuum vessels consisting wholly or partially of ceramic material, may be thin metal layers or skins. The component parts of the envelope may be metallized or plated with thin layers of metal at the places at which the parts are joined together. A vacuum tight connection between the metal layer and the ceramic parts may be obtained by cathodic atomizing or condensation in vacuum, by electrolysis, or by burning-on metal powder on the ceramic. Two ceramic bodies may be joined to each other by means of a glass-like melting liquid, but such melting liquid has the disadvantage of high dielectric losses when used in high frequency fields. This disadvantage is minimized in current lead-in conductors constructed according to this invention. The contacting surfaces of two flat ceramic bodies are joined together in a ground fit, the contacting surfaces preferably being flat or at an obtuse angle to the center line of the bodies so that the plane of the seal is substantially parallel to the bodies.

The drawing is a sectional view of an envelope of an electron discharge device embodying this invention. Envelope 1 with a flat portion such as an inturned flange or ring 2, ring 3, and plate or disc 4 are made of ceramic material which may be similar in composition, and are ground to a smooth fit along their contacting surfaces. To join gas tight the several parts they are metallized with a thin metal coating, are placed atop each other in the manner shown, and are heated to a high temperature. The parts of the metal coatings which touch each other are fused or soldered together in a strong vacuum tight junction. It may be desirable to press the parts together during the burning-in process. If heating to a very high temperature should be avoided, a metal can be used for producing the vacuum tight connection which has a lower melting point than the metal coating.

As distinguished from the ceramic-to-metal seal in which the plane of the seal is cylindrical and in which radial mechanical strains may be set up normal to the plane of the seal during heating, the plane of the seal according to this invention is parallel to or at a small angle with the plane of the ceramic bodies so that the shearing strength of the seal will withstand considerable stress caused by unequal expansions of the ceramic bodies.

In the example shown, current lead-in connections for electrodes inside the envelope may be made to extensions 5 and 6 of the sealing metal coating. The thickness of the exposed parts of the metal layers serving for the connections may be greater than the thickness of the metal between the ceramic bodies to obtain greater mechanical strength. This increase in thickness at the places for the connections may be carried out by applying readily melting metal or by means of electrolysis.

The metal layer may be chosen with a thickness less than 0.1 mm. However, the layer should not be so thin as to cause difficulty in filling out irregularities in the surfaces of the ceramic bodies which may remain despite fitting through grinding. The layer of metal employed for fusing or soldering the metallized parts together must be chosen with such a thickness that the irregularities in the contacting surfaces can be filled in and seal the parts gas tight.

I claim:

1. An electron discharge device comprising a ceramic envelope wall with an opening, a flat apertured ring of ceramic material of greater outside diameter than said opening and overlying the edges of the opening, a disc of ceramic material of greater diameter than the aperture in said ring and overlying the aperture, and metal soldered gas tight junctions between flat registering surfaces of said wall and said ring and between said ring and said disc, the metal of the junctions extending beyond the junctions to the inside and outside of the envelope to form lead-in conductors.

2. An electron discharge device comprising a ceramic envelope wall with an opening, a flat apertured ring of ceramic material of greater outside diameter than said opening and overlying the edges of the opening, a disc of ceramic material of greater diameter than the aperture of said ring and overlying the aperture, the overlying surfaces of the envelope wall, ring and disc being metallized and fused directly in gas-tight junctions, the metallized areas of the envelope wall, ring and disc extending beyond the junctions to the inside and outside of the envelope to form lead-in conductors.

WILHELM ZIEGENBEIN.